US012585426B2

(12) United States Patent (10) Patent No.: US 12,585,426 B2

Morsy et al. (45) Date of Patent: Mar. 24, 2026

(54) ARTIFICIAL REALITY BASED SYSTEM, METHOD AND COMPUTER PROGRAM FOR PRE-CUEING MUSIC AUDIO DATA

(71) Applicant: ALGORIDDIM GMBH, Munich (DE)

(72) Inventors: Kariem Morsy, Munich (DE);
Frederik Seiffert, Munich (DE);
Federico Tessmann, Munich (DE)

(73) Assignee: ALGORIDDIM GMBH, Munich (DE)

( * ) Notice: Subject to any disclaimer, the term of this patent is extended or adjusted under 35 U.S.C. 154(b) by 146 days.

(21) Appl. No.: 18/394,825

(22) Filed: Dec. 22, 2023

(65) Prior Publication Data

US 2024/0402982 A1 Dec. 5, 2024

Related U.S. Application Data

(60) Provisional application No. 63/505,858, filed on Jun. 2, 2023.

(51) Int. Cl.
*G06F 3/16* (2006.01)
*G06F 3/01* (2006.01)
(Continued)

(52) U.S. Cl.
CPC .............. *G06F 3/165* (2013.01); *G06F 3/014* (2013.01); *G06F 3/017* (2013.01); *G06T 19/006* (2013.01); *G06V 40/28* (2022.01)

(58) Field of Classification Search
CPC ........ G06F 1/1694; G06F 3/014; G06F 3/017; G06F 3/0304; G06F 3/165; G06F 3/167; G06F 1/1632; G06F 3/0412; G06T 19/006; G06T 7/593; G06V 40/172; G06V 40/28; G06V 40/10; G10H 1/0008; G10H 1/361; G10H 1/40; G10H 1/46; G10H 2210/241; G10H 2220/201; G10H 2220/321;
(Continued)

(56) References Cited

U.S. PATENT DOCUMENTS 6,541,690 B1 4/2003 Segers, Jr.
7,592,534 B2 9/2009 Yoshikawa et al.
(Continued)

FOREIGN PATENT DOCUMENTS

EP 4068052 A1 10/2022

OTHER PUBLICATIONS

U.S. Appl. No. 18/394,899, Non-Final Office Action, Mailed on Apr. 17, 2025, 17 pages.
(Continued)

*Primary Examiner* — Gerald Gauthier
(74) *Attorney, Agent, or Firm* — Kilpatrick Townsend & Stockton LLP

(57) ABSTRACT

The present invention relates to a system for processing audio data, comprising an audio input unit for receiving audio data representing a piece of music, an audio processing unit for processing the audio data, an audio output unit for playing the audio data, and a gesture detecting apparatus for detecting a pre-cue gesture of a user, wherein the pre-cue gesture comprises moving a hand of the user towards an ear of the user, wherein the audio processing unit is connected to the gesture detecting apparatus such as to change processing of the audio data based on the pre-cue gesture detected by the gesture detecting apparatus.

11 Claims, 3 Drawing Sheets

Figure 1:
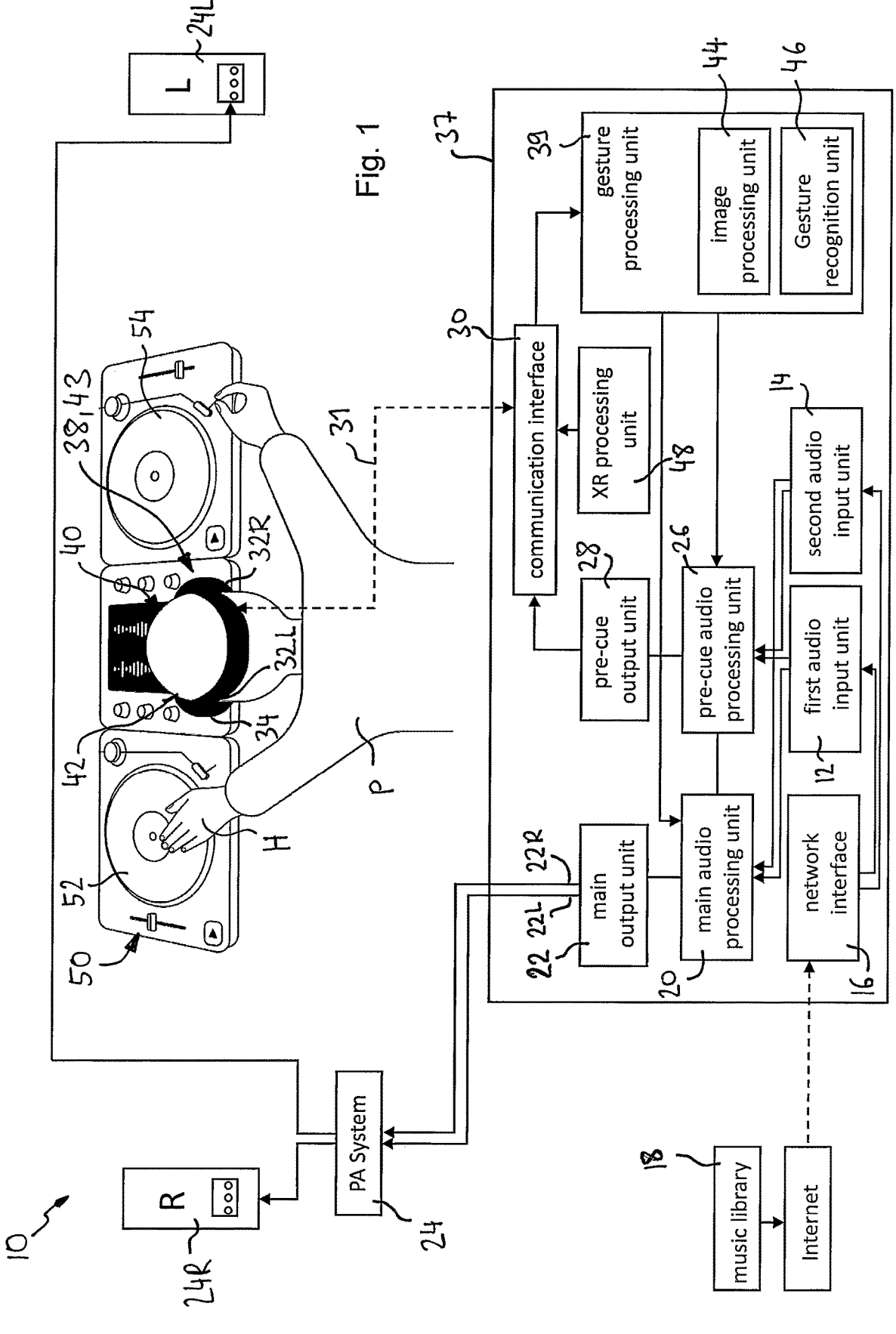

(51) Int. Cl.
*G06T 19/00* (2011.01)
*G06V 40/20* (2022.01)

(58) Field of Classification Search
CPC ....... G10H 2220/401; G10H 2250/035; G11B 20/00992; H02J 50/001; H04R 5/033; H04R 1/1041; H04R 1/406; H04S 7/30; H04S 7/304; H04L 12/282; H04N 21/4404
See application file for complete search history.

(56) References Cited

U.S. PATENT DOCUMENTS

| | | | |
|---|---|---|---|
| 8,369,974 B2 | 2/2013 | Daisy | |
| 8,636,199 B1 | 1/2014 | Slayden et al. | |
| 9,208,765 B1 | 12/2015 | Sivertsen | |
| 9,583,140 B1* | 2/2017 | Rady | H04N 21/44004 |
| 10,284,695 B1* | 5/2019 | Gejji | G06F 1/1632 |
| 2004/0089141 A1 | 5/2004 | Georges et al. | |
| 2006/0034043 A1 | 2/2006 | Hisano et al. | |
| 2007/0079241 A1* | 4/2007 | Wang | G11B 20/00992 |
| | | | 715/727 |
| 2008/0205681 A1 | 8/2008 | Norberg et al. | |
| 2009/0109795 A1 | 4/2009 | Marti | |
| 2009/0286601 A1* | 11/2009 | Rubio | G10H 1/361 |
| | | | 463/36 |
| 2010/0013613 A1 | 1/2010 | Weston | |
| 2010/0151946 A1* | 6/2010 | Wilson | G06T 7/593 |
| | | | 463/43 |
| 2010/0318204 A1 | 12/2010 | Daisy | |
| 2012/0059494 A1* | 3/2012 | David | G10H 1/40 |
| | | | 700/94 |
| 2012/0130516 A1 | 5/2012 | Reinsch et al. | |
| 2012/0310392 A1 | 12/2012 | Abuelsaad et al. | |
| 2013/0131850 A1 | 5/2013 | Carrier | |
| 2013/0154930 A1* | 6/2013 | Xiang | G06F 3/167 |
| | | | 345/158 |
| 2013/0259238 A1* | 10/2013 | Xiang | G06F 3/017 |
| | | | 381/17 |
| 2013/0305152 A1 | 11/2013 | Griffiths et al. | |
| 2013/0345842 A1* | 12/2013 | Karakaya | H04R 1/1041 |
| | | | 700/94 |
| 2014/0002376 A1 | 1/2014 | Oliver et al. | |
| 2014/0173440 A1* | 6/2014 | Dal Mutto | G06F 3/0304 |
| | | | 715/728 |
| 2014/0214189 A1 | 7/2014 | Goodwin | |
| 2014/0267002 A1 | 9/2014 | Luna | |
| 2014/0316543 A1 | 10/2014 | Sharma et al. | |
| 2014/0358263 A1* | 12/2014 | Irmler | G06F 3/014 |
| | | | 700/94 |
| 2015/0148927 A1 | 5/2015 | Georges et al. | |
| 2015/0220178 A1 | 8/2015 | Zeliff et al. | |
| 2015/0268921 A1 | 9/2015 | Georges | |
| 2015/0286360 A1* | 10/2015 | Wachter | G06F 3/0412 |
| | | | 345/173 |
| 2015/0331659 A1* | 11/2015 | Park | G06F 3/165 |
| | | | 700/94 |
| 2015/0355879 A1 | 12/2015 | Beckhardt et al. | |
| 2015/0371529 A1* | 12/2015 | Dolecki | G06F 1/1694 |
| | | | 700/94 |
| 2016/0116988 A1* | 4/2016 | Priyantha | H02J 50/001 |
| | | | 345/156 |
| 2017/0329409 A9* | 11/2017 | Chun | G06F 3/0304 |
| 2018/0088672 A1* | 3/2018 | Schantz | G06F 3/167 |
| 2018/0182387 A1* | 6/2018 | Chua | H04R 1/406 |
| 2018/0192226 A1* | 7/2018 | Woelfl | H04R 5/033 |
| 2018/0218561 A1 | 8/2018 | Oldroyd et al. | |
| 2018/0270576 A1* | 9/2018 | Chua | H04L 12/282 |
| 2018/0277160 A1 | 9/2018 | Soda et al. | |
| 2019/0232500 A1 | 8/2019 | Bennett et al. | |
| 2019/0236842 A1 | 8/2019 | Bennett et al. | |
| 2020/0294313 A1 | 9/2020 | Arroyo Palacios et al. | |
| 2021/0004146 A1 | 1/2021 | Linville et al. | |
| 2021/0191526 A1* | 6/2021 | Heo | G06V 40/172 |
| 2022/0199056 A1 | 6/2022 | Morsy | |
| 2023/0169498 A1 | 6/2023 | Sado | |
| 2023/0274512 A1 | 8/2023 | Terre et al. | |
| 2023/0343314 A1 | 10/2023 | Morsy et al. | |
| 2023/0419931 A1 | 12/2023 | Takei et al. | |
| 2024/0071605 A1* | 2/2024 | Bradley | G06V 40/10 |
| 2024/0126369 A1 | 4/2024 | Fujita | |
| 2024/0402981 A1 | 12/2024 | Tessmann et al. | |
| 2024/0402982 A1* | 12/2024 | Morsy | G06T 19/006 |

OTHER PUBLICATIONS

European Application No. 24179428.8 , "Extended European Search Report", Sep. 30, 2024, 11 pages.
Paradise Decay: "Master DJ Lessons in VR With Vinyl Reality // OCulus Rift+ Touch // GTX 1060 (6GB)", Aug. 21, 2018 (Aug. 21, 2018), XP093205562, Retrieved from: URL:https://www.youtube.com/watch? v=Stqafits5ms, retrieved on Sep. 16, 2024, 2 pages.
Anonymous: "how_to_use_the_virtual_headphones [Vinyl Reality Wiki]", May 14, 2019 (May 14, 2019), XP093205508, Retrieved from the Internet: URL:https://vinyl-reality.com/wiki/ doku.php? id=how_to_use_the_virtual_headphones, retrieved on Sep. 16, 2024, 2 pages.
Anonymous: "mixer_input_control_overview [Vinyl Reality Wiki]", Aug. 5, 2020 (Aug. 5, 2020), XP093205543, Retrieved from the Internet: URL:https://vinyl-reality.com/wiki/ doku. ph p?id=m ixer _in put_ control_ overview, retrieved on Sep. 16, 2024, 4 pages.
Behrens: "Hardware, Software: Alles, was du als VR-DJ zum Auflegen brauchst—Bonedo", Jun. 13, 2019 (Jun. 13, 2019), XP093205531 , Retrieved from the Internet: URL:https://www.bonedo.de/artikel/ hardware-software-alles-was-d u-al s-vr-dj-zu m-auflegen-brau ch sV, retrieved on Sep. 16, 2024, 29 pages.
U.S. Appl. No. 18/394,694, "Non-Final Office Action", Sep. 24, 2025, 26 pages.
U.S. Appl. No. 18/394,899, "Final Office Action", Sep. 22, 2025, 16 pages.
U.S. Appl. No. 18/394,763, Non-Final Office Action mailed Aug. 5, 2025, 12 pages.
U.S. Appl. No. 18/394,763, "Notice of Allowance", Dec. 8, 2025, 18 pages.

* cited by examiner

ARTIFICIAL REALITY BASED SYSTEM, METHOD AND COMPUTER PROGRAM FOR PRE-CUEING MUSIC AUDIO DATA

CROSS-REFERENCE TO RELATED APPLICATIONS

This non-provisional application claims priority to U.S. Patent application No. 63/505,858, filed on Jun. 2, 2023, the disclosure of which is herein incorporated by reference in its entirety for all purposes.

DESCRIPTION

The present invention relates to a system for processing audio data comprising an audio input unit for receiving audio data representing a piece of music, an audio processing unit for processing the audio data to obtain output data and an audio output unit for playing the output data. Further, the invention relates to a method for processing audio data as well as a related computer program.

Systems for processing audio data of the above-mentioned type are known in particular as music players or DJ systems for playback of music. Especially DJ systems have a plurality of functions allowing a DJ to manipulate the audio data before playback, for example by applying audio effects, modifying the volume or mixing the audio data with audio data from another piece of music.

An important function of conventional DJ systems is a pre-cue feature, which allows the user (the DJ) to play back a first piece of music to an audience and at the same time listen to a second piece of music via headphones such as to preview the content of the second piece of music for various adjustments before presenting it to the audience, for example playing a smooth crossover from the first piece of music to the second piece of music. For pre-cuing, the second piece of music is routed via a pre-cue or monitor output to a pair of headphones of the DJ, and the DJ may hold one side of the pair of headphones with one hand, such as to cup one ear with that side of the headphones and thus listen to the second song with one ear, while leaving the other ear uncovered, such as to hear the main output of the DJ system through the PA system in the same way as the audience.

In this way, the DJ may hear both pieces of music, which assists tasks such as matching beats or pitches between the songs.

The conventional pre-cue functionality is confined to a specific type of headphones, which supports the quick and repeated movements of one side of the headphones over the ear and away from the ear. Therefore, this known way to realize pre-cuing cannot be used for other types of personal monitors, such as in-ear headphones or novel headsets.

It is therefore an object of the present invention to provide a system, a method and a computer program, which implement a pre-cue function that can be operated by a user in a simple and intuitive way similar to a conventional pre-cuing operation, but can be used in connection with different types of personal monitoring systems, in particular different headphones or headsets.

According to a first aspect of the present invention, this object is achieved by a system for processing audio data, comprising an audio input unit for receiving audio data representing a piece of music, an audio processing unit for processing the audio data, an audio output unit for playing the audio data, and a gesture detecting apparatus for detecting a pre-cue gesture of a user, wherein the pre-cue gesture comprises moving a hand of the user towards an ear of the user, and wherein the audio processing unit is connected to the gesture detecting apparatus such as to change processing of the audio data based on the pre-cue gesture detected by the gesture detecting apparatus.

According to an important feature of the present invention, the system comprises a gesture detecting apparatus for detecting a pre-cue gesture of a user comprising moving a hand of the user towards an ear of the user, wherein audio processing is changed based on the detected pre-cue gesture. It is therefore no longer necessary to actually physically move one side of the headphones over the ear of the user or away from the ear in order to modify the audio data audible for the user. Instead, the headphones or any other suitable personal monitoring system connected to the audio output unit for playing the audio data to the user may physically remain unchanged while the required change of the audio data is commanded by the hand-to-ear gesture. In this way, a pre-cue functionality may be realized not only for a great variety of personal monitoring systems, such as different types of headphones, but the pre-cue operation of the user can also be simplified as it is sufficient for the user to move his/her hand towards the ear, and it is no longer necessary to actually physically grab and move one side of a pair of headphones or to grab and move any other physical object.

At the same time, the system of the present invention can be operated in an easy and intuitive manner, because the pre-cue gesture corresponds to the natural gesture known to DJs for initiating a pre-cue operation. In this way, user acceptance can be enhanced.

In a preferred embodiment of the present invention, the audio processing unit is configured to increase a volume of the audio data based on the detection of the pre-cue gesture. In this way, the audio data can be made audible or can be made louder as soon as the user moves his/her hand towards the ear.

Furthermore, the gesture detecting apparatus is preferably configured to detect a position of the hand of the user, and the audio processing unit is configured to set a volume of the audio data as being dependent on a hand-ear distance, which is a distance between the position of the hand of the user and a position of an ear of the user, preferably such as to continuously increase a volume of the audio data with decreasing hand-ear distance and/or to continuously decrease the volume of the audio data with increasing hand-ear distance. In this embodiment, playback of the audio data is therefore not suddenly switched on or off, which may lead to some confusion of the user, but the volume of the audio data is continuously changed depending on a detected hand-ear distance. With the audio data becoming louder as the hand approaches the ear and quieter as the hand is moved away from the ear, the system provides a smooth transition between pre-cuing and not pre-cuing, and gives the user a precise yet smooth feedback with regard to the effect that the movement of his/her hand has. At the same time, the user can control the loudness of the pre-cued audio signal, in particular in relation to other sounds, such as an audience mix sent towards the audience.

In a further preferred embodiment of the present invention, the gesture detecting apparatus classifies a detected hand gesture of the user as being a pre-cue gesture, only if a hand-ear distance (a distance between the position of the hand of the user and a position of an ear of the user) is lower than a predetermined first threshold value at least at some point in time during the hand gesture. By setting a first threshold value as described above, it can be ensured that only hand gestures closer to the user's ear, which may potentially be intended by the user as a pre-cue gesture, may actually be classified by the gesture detecting apparatus as a pre-cue gesture, while hand gestures further away from the user's ear will be not classified as pre-cue gestures and therefore not initiate a pre-cue mode, even if such hand gestures include a movement of the user's hand towards an ear of the user. Therefore, the user may move his/her hands in an area further away from the ear in order to operate other DJ control elements or perform other tasks, wherein false detection of a user's intention to enter a pre-cue mode can be avoided.

In a further preferred embodiment of the present invention, the system provides a pre-cue mode, wherein, when the pre-cue mode is activated, the audio processing unit is configured to set a volume of the audio data as being dependent on a hand-ear distance (a distance between the position of the hand of the user and a position of an ear of the user), and when the pre-cue mode is deactivated, the audio processing unit is configured to set a volume of the audio data as being independent from the hand-ear distance, wherein the system is configured to activate the pre-cue mode, when the hand-ear distance is lower than a predetermined second threshold value, and wherein the system is preferably configured to deactivate the pre-cue mode, when the hand-ear distance is higher than a predetermined third threshold value.

In the above-described embodiment, activation or deactivation of a pre-cue mode is commanded depending on a hand-ear distance being lower than a predetermined second threshold value or higher than a predetermined third threshold value, respectively. This means that the pre-cue mode may remain active and the volume of the audio data is set according to the detected hand-ear distance as long as the hand-ear distance is lower than the third threshold value. Therefore, pre-cueing is continued as long as the hand-ear distance is below the first threshold value, even if the hand is moved in different directions or maintained still. This provides an easy and intuitive control and avoids unintended deactivation of the pre-cue mode. In a simple embodiment, the second threshold value may be equal to the third threshold value. However, in another embodiment the third threshold value may be larger than the second threshold value in order to provide for some hysteresis and avoid frequent alternating activation and deactivation of the pre-cue mode near the threshold value.

In a further preferred embodiment of the present invention, the gesture detecting apparatus classifies a detected hand gesture in which a hand of the user is moved towards an ear of the user as not being a pre-cue gesture, if the gesture detecting apparatus detects a substantially simultaneous movement of both hands of the user towards a head of the user. In this manner, a false positive detection of a pre-cue gesture can be avoided when the user moves his/her hands towards the head for other purposes than pre-cuing, for example for adjusting the seat of a headset.

In a further preferred embodiment of the present invention, the output unit is a multi-channel unit, in particular a stereo unit, configured to output the audio data as multichannel audio data, in particular stereo audio data, via at least a left channel and a right channel. By providing the audio data as multi-channel audio data, the flexibility for providing pre-cue functionality can be enhanced, for example since both ears may be used for different pre-cue channels, transporting different audio signals, for example from different pieces of music. Specifically, in a preferred embodiment of the present invention, the audio processing unit includes a spatial audio unit configured to generate the multichannel audio data as spatial audio data based on a given spatial source position of a sound source, wherein the gesture detecting apparatus is configured to detect a position in space of the hand of the user, and wherein the spatial audio unit is configured to generate the multichannel audio data based on the detected position of the hand of the user, such that the audio data are audible for the user as coming from the detected position in space of the hand of the user. Therefore, the multi-channel audio data can be presented to the user as spatial audio data creating an impression of the audio data as coming from the current position in space of the hand of the user. The user therefore has the impression that the sound is coming from a virtual sound source held in his/her hand. Accordingly, when the user moves the hand around in the three-dimensional space around the user, the spatial audio unit may be configured to generate, preferably in real-time, i.e. without any audible latency, multi-channel audio data as spatial audio data in accordance with the current hand position detected by the gesture detecting apparatus, such that the user has the impression that the sound source that emits the sound according to the audio data is moving in space along with or fixed to the user's hand. This greatly enhances user experience and intuitive operation of the system.

If the audio data originally received by the input unit are stereo data, the audio data will preferably be converted into mono data before being sent to the spatial audio unit.

In a further preferred embodiment of the present invention, the system may comprise a first audio input unit for receiving first audio data representing a first piece of music, a second audio input unit for receiving second audio data representing a second piece of music different from the first piece of music, wherein the audio processing unit is configured to process at least one of the first audio data and the second audio data, wherein the audio processing unit is connected to the gesture detecting apparatus and the audio output unit such as to activate a first pre-cue mode in which the audio output unit outputs exclusively or predominantly the first audio data, when the gesture detecting apparatus detects the pre-cue gesture.

The above-described embodiment may thus have capabilities to receive audio data of two different pieces of music, wherein the user may use the pre-cue gesture to activate pre-cuing of one of the two pieces of music. For example, the second piece of music may meanwhile be played back towards an audience through a main audio output unit and the user can at the same time listen to the first piece of music by routing the first audio data towards his/her headphones.

In a preferred variant of the above-described embodiment, the gesture detecting apparatus is configured to detect a first pre-cue gesture comprising moving a hand of the user towards a left ear of the user, and to detect a second pre-cue gesture comprising moving a hand of the user towards a right ear of the user, and wherein the audio processing unit is configured to activate the first pre-cue mode, when the gesture detecting apparatus detects the first pre-cue gesture, and to activate a second pre-cue mode in which the output unit outputs exclusively or predominantly the second audio data, when the gesture detecting apparatus detects the second pre-cue gesture. In this way, the user may thus listen to the first piece of music by moving a hand towards the left ear, and may listen to the second piece of music by moving a hand towards the right ear. When the audio data are provided as multi-channel audio data, the first and second pre-cue modes may conveniently use the left and right channels to send the first and second audio data to the left and right sides of the user's headphones, respectively. Alternatively, the pre-cue audio data can be set to predominantly or exclusively include that audio data (from the first audio data and the second audio data) which is currently not audible, e.g., because the crossfader might be on the respective opposite side.

In another preferred embodiment of the invention, the gesture detecting apparatus may be configured to detect a left-ear pre-cue gesture comprising moving a hand of the user towards a left ear of the user, and to detect a right-ear pre-cue gesture comprising moving a hand of the user towards a right ear of the user, wherein the audio processing unit is configured to increase the volume of the audio data on a left stereo channel upon detection of the left-ear pre-cue gesture and to increase the volume of the audio data on a right stereo channel upon detection of the right-ear pre-cue gesture.

In a further preferred embodiment of the present invention, the audio processing unit is a monitor audio processing unit, wherein the output unit is a monitor output unit, and wherein the system further comprises: a main audio processing unit for processing the first audio data and the second audio data, wherein the audio processing unit includes a crossfader unit for setting a first volume level associated to the first audio data and a second volume level associated to the second audio data, and a main mixing unit for mixing the first audio data at the first volume level with the second audio data at the second volume level such as to obtain main output data, and a main audio output unit for playing the main output data. By providing a monitor audio processing unit and a monitor output unit in addition to a main audio processing unit and a main output unit, two different audio signals may be played back simultaneously, one to an audience and another one to the DJ.

Such system may further comprise headphones to be worn by the user or at least one monitor speaker to be directed towards the user, wherein the headphones or the monitor speaker are connected to the monitor audio output unit, at least one PA speaker to be directed towards an audience, wherein the PA speaker is connected to the main audio output unit.

In a further preferred embodiment of the present invention, the gesture detecting apparatus may use a touchless user interface and may preferably comprise a camera adapted to capture images of the user's hand, and a gesture recognition unit configured to analyze the images captured by the camera to recognize a movement of the hand towards the ear, wherein the gesture detecting apparatus preferably further comprises a hand position unit configured to detect a position in space of the hand of the user. Touchless gesture detection, such as camera-based gesture detection, allows a hands-free, natural operation, i.e., touchless operation of the system by just moving the hands to perform certain gestures. It is especially not necessary to provide hardware controllers to be held by the user during operation of the system. The camera may for example be mounted to or built into a headset to be worn by the user. An example of a conventional headset comprising a camera is a device available on the marked as "Meta Quest Pro".

If a camera is used, the camera is preferably arranged such that a field of view of the camera covers an area in front of the user, but does not cover the ear, and wherein the gesture detecting apparatus is configured to detect the pre-cue gesture or to activate the pre-cue mode or to maintain the pre-cue mode active, when detecting the hand of the user leaving the field of view while moving in a direction towards the ear. Especially when the camera is mounted to a headset of the user, the camera usually does not cover the regions of the ears of the user, such that the camera can actually not directly recognize the user's hand when it actually touches one of the ears. In order to cope with this restriction, the gesture detection apparatus, in an embodiment of the present invention, may calculate a position of at least one of the ears of the user based on (1) the position of the camera itself (which can be known to the gesture detecting apparatus through suitable calibration of the camera in the three-dimensional space as conventionally known as such in the prior art), and (2) given geometric data of the headset as well as standard data of human anatomy. With the gesture detecting apparatus comprising a hand position unit configured to detect a position in space of the hand of the user, the system may then calculate a current hand-ear distance, i.e., a distance between a current hand position and the position of the ear.

When the hand moves towards the ear and thereby leaves the field of view of the camera, the hand positions may afterwards be estimated by the gesture detecting apparatus through extrapolation on the basis of the direction and velocity of movement of the hand until the hand has left the field of view. With sufficient accuracy, it is therefore possible to still estimate the hand-ear distance, even if the hand is outside the field of view of the camera and can therefore not actually be identified in the camera images. In a simple embodiment, the hand-ear distance can be assumed to be zero if the hand is outside the field of view of the camera or has left the field of view of the camera.

According to a second aspect of the present invention, the above-mentioned object is achieved by a method according to one of the following items, wherein the effects and advantages of the method of the second aspect substantially correspond to the effects and advantages of the corresponding system of the first aspect of the invention as described above.

Item 1: Method for processing audio data, comprising the steps of providing audio data representing a piece of music, processing the audio data, and playing the audio data, wherein the method further comprises detecting a pre-cue gesture of a user, wherein the pre-cue gesture comprises moving a hand of the user towards an ear of the user, and wherein processing of the audio data is changed based on a detected pre-cue gesture.

Item 2: Method of item 1, wherein a volume of the audio data is increased based on the detection of the pre-cue gesture.

Item 3: Method of item 1 or item 2, wherein a volume of the audio data is set as being dependent on a hand-ear distance detected by a gesture detecting apparatus, wherein the hand-ear distance is a distance between a position of the hand of the user as detected by the gesture detecting apparatus, and an ear of the user, wherein the method preferably continuously increases a volume of the audio data with decreasing hand-ear distance and/or to continuously decreases the volume of the audio data with increasing hand-ear distance.

Item 4: Method of at least one of items 1 to 3, further comprising classifying a detected hand gesture of the user as being a pre-cue gesture, if (preferably only if) a hand-ear distance is lower than a predetermined first threshold value at least at some point in time during the hand gesture.

Item 5: Method of at least one of the preceding items, wherein the method provides a pre-cue mode, wherein, when the pre-cue mode is activated, a volume of the audio data is set as being dependent on a hand-ear distance, and when the pre-cue mode is deactivated, a volume of the audio data is set as being independent from the hand-ear distance, wherein the pre-cue mode is activated, when the hand-ear distance is lower than a predetermined second threshold value, and wherein the pre-cue mode is deactivated, when the hand-ear distance is higher than a predetermined third threshold value.

Item 6: Method of at least one of the preceding items, wherein a detected hand gesture in which a hand of the user is moved towards an ear of the user is classified as not being a pre-cue gesture, if a substantially simultaneous movement of both hands of the user towards a head of the user is detected.

Item 7: Method of at least one of the preceding items, wherein the audio data are processed and output as multichannel audio data, in particular stereo audio data, via at least a left channel and a right channel.

Item 8: Method of item 7, wherein the multichannel audio data are generated as spatial audio data based on a given spatial source position of a sound source, wherein a position in space of the hand of the user is detected, and wherein the multichannel audio data are generated based on the detected position of the hand of the user, such that the audio data are audible for the user as coming from the detected position in space of the hand of the user.

Item 9: Method of at least one of the preceding items, comprising the steps of receiving first audio data representing a first piece of music, receiving second audio data representing a second piece of music different from the first piece of music, and processing at least one of the first audio data and the second audio data, wherein a first pre-cue mode is activated in which the audio output unit outputs exclusively or predominantly the first audio data, when the pre-cue gesture is detected.

Item 10: Method of item 9, wherein the method is configured to detect a first pre-cue gesture comprising moving a hand of the user towards a left ear of the user, and to detect a second pre-cue gesture comprising moving a hand of the user towards a right ear of the user, and wherein the first pre-cue mode is activated, when the gesture detecting apparatus detects the first pre-cue gesture, and a second pre-cue mode in which the output unit outputs exclusively or predominantly the second audio data is activated, when the gesture detecting apparatus detects the second pre-cue gesture.

Item 11: Method of item 7 and item 10, wherein in the first pre-cue mode, the first audio data are output exclusively or predominantly via the first channel, whereas in the second pre-cue mode, the second audio data are output exclusively or predominantly via the second channel.

Item 12: Method of at least one of items 9 to 11, wherein the audio data are monitor audio data and wherein the system further processes main audio data obtained from mixing the first audio data at a first volume level with the second audio data at a second volume level, and wherein the method further comprises the step of playing the main output data via a main audio output unit and playing the monitor audio data via a monitor audio output unit separate from the main audio output unit.

Item 13: Method of item 12, wherein the monitor audio data are played back through a pair of headphones or through at least one monitor speaker directed towards the user, and wherein the main audio data are played back through at least one PA speaker directed towards an audience.

Item 14: Method of at least one of the preceding items, wherein gesture detection is implemented by using a touchless user interface, preferably a camera capturing images of the user's hand, and by analyzing the images captured by the camera to recognize a movement of the hand towards the ear, and wherein the touchless user interface preferably further detects a position in space of the hand of the user.

Item 15: Method of item 14, wherein the camera is arranged such that a field of view of the camera covers an area in front of the user, but does not cover the ear, and wherein the gesture detecting apparatus detects the pre-cue gesture or activates the pre-cue mode or maintains the pre-cue mode active, when detecting the hand of the user leaving the field of view while moving in a direction towards the ear.

Item 16: Method of at least one of the preceding items, wherein an artificial reality apparatus is used to provide a visual input for the user to create an artificial reality environment, the artificial reality apparatus preferably comprising a headset wearable by the user, wherein the headset comprises an artificial reality display and headphones.

Figures 2, 3:
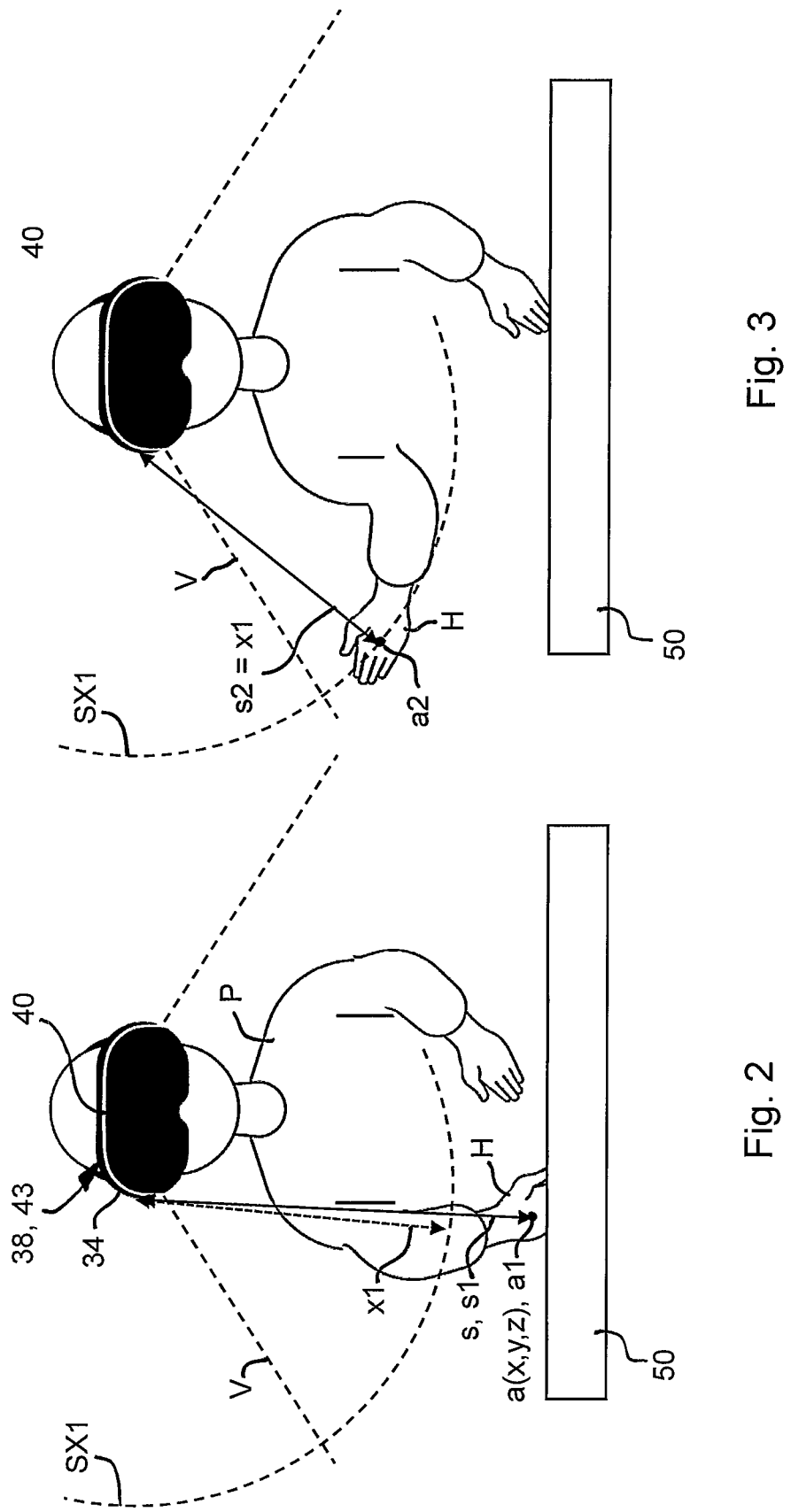
Figures 4, 5:
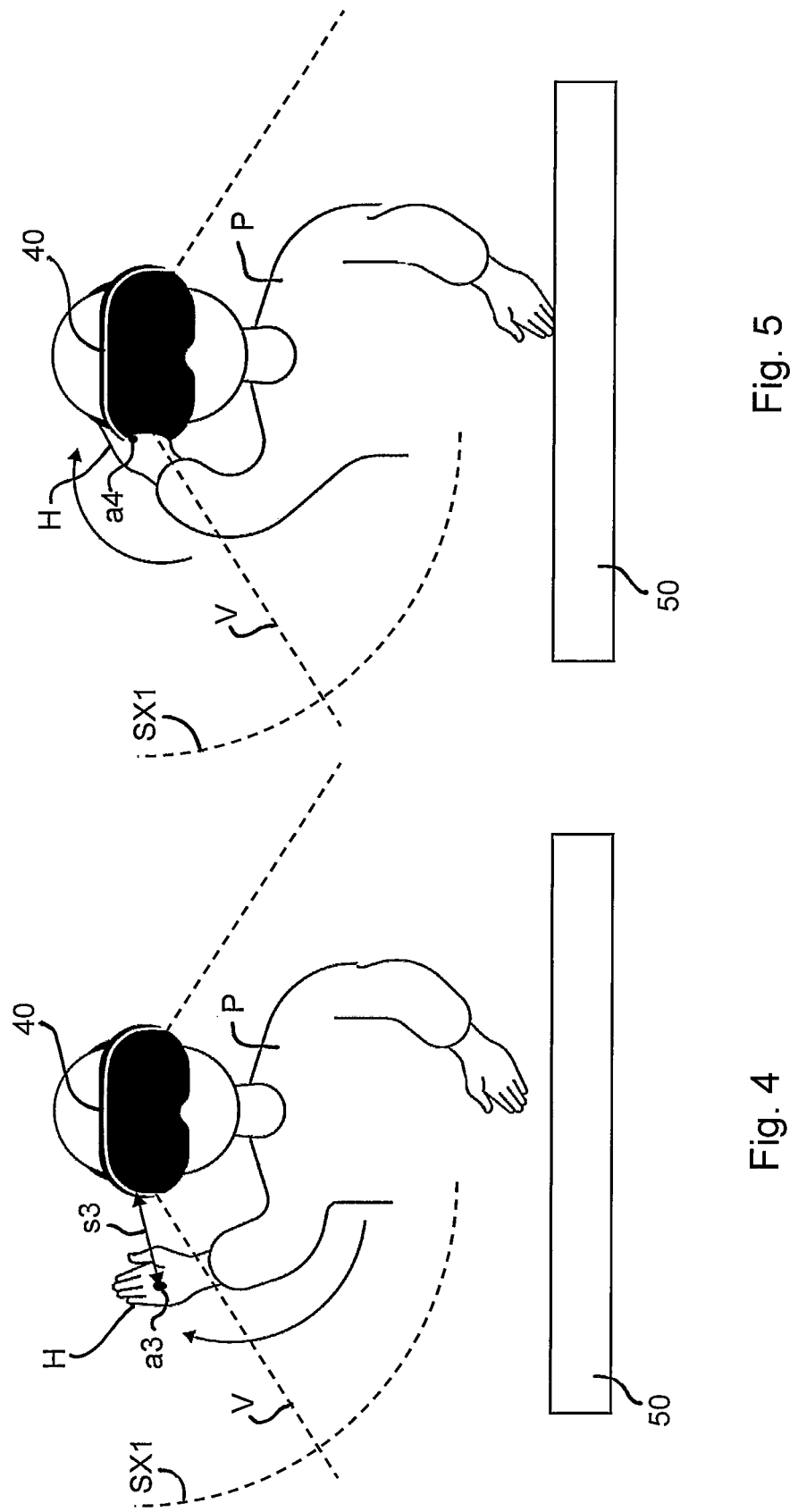

A preferred embodiment of the invention will now be described with reference to the drawings, in which FIG. 1 is a schematic illustration of a system for processing audio data according to an embodiment of the present invention, FIG. 2 illustrates an operation of a gesture detecting apparatus according to the embodiment when a pre-cue gesture is not detected, FIG. 3 illustrates an operation of the gesture detecting apparatus according to the embodiment when a pre-cue gesture is detected, FIG. 4 illustrates an operation of the gesture detecting apparatus according to the embodiment when the user's hand leaves a field of view of the camera while a pre-cue mode is activated, and FIG. 5 illustrates an operation of the gesture detecting apparatus according to the embodiment when the user's hand actually reaches an ear of the user while the pre-cue mode is activated.

With reference to FIG. 1, a system 10 for processing audio data according to the embodiment of the present invention generally comprises a first audio input unit 12 for receiving first audio data representing a first piece of music, and a second audio input unit 14 for receiving second audio data representing a second piece of music, which is in particular different from the first piece of music. First and second audio input units 12, 14 may be connected to a local network interface 16, such as to receive the first and second audio data through a network, for example through the Internet, from a remote music library 18, which may be a commercial music distribution platform (for example Apple Music or Spotify). The first and second audio data may in particular be streamed from the music library 18 for substantially immediate processing and playback. Alternatively, first and second audio input units 12, 14 may receive audio data of first and second pieces of music from a local storage device, for example a local hard drive integrated in or connected to the system 10. The first and second pieces of music may be provided to or by the respective audio input units 12, 14 in any conventional digital format, in particular standard audio formats, such as MP3, WAV, AIFF, etc. The audio data may be provided in a decompressed format and/or the audio input units 12, 14 may include a decompressor for decompressing audio data received in compressed format.

First and second audio processing units 12, 14 are preferably connected to a main audio processing unit 20, wherein main audio processing unit 20 receives the first and second audio data and is configured to process the audio data as main audio data so as to obtain main output data. Processing of the main audio data may include passing one of the first audio data and the second audio data substantially without modification such that the main output data resembles either the first audio data or the second audio data. Furthermore, main audio processing unit 20 may modify the first and/or the second audio data by applying an audio effect, changing volume, applying transport effects (looping, scratching effects), etc. Main audio processing unit 20 may also control playback of the first audio data and/or the second audio data and/or the main audio data, i.e., may start playback, stop playback or change playback position of any of the audio data. In a further embodiment, main audio processing unit 20 may mix the first audio data with the second audio data such as to obtain mixed audio data. Mixing of the audio data may be carried out at different volume ratios, such that the main audio data predominantly or exclusively include the first audio data or the second audio data depending on the setting of a cross-fade controller. All of the above-described types of audio processing may be implemented in main audio processing unit 20 in any combination with one another as conventionally known for DJ mixers in the prior art.

Main audio processing unit 20 is connected to a main output unit 22 which receives the main audio data from the main audio processing unit 20 and processes it for sound output. For this purpose, main output unit 22 may include a digital-to-analog converter for converting the digital main audio data into analog audio signals. Main output unit 22 is preferably a stereo output unit and receives the main audio data from main audio processing unit 20 in a stereo (or alternative multi-channel) format. Therefore, main output unit 22 outputs a stereo audio signal via a left audio channel 22L and a right audio channel 22R for sound output. Left and right audio channels 22L, 22R may be connected to a PA system 24, for example via audio cables or by using a wireless audio connection, wherein PA system 24 may comprise left and right PA speakers 24L and 24R directed towards an audience (usually away from the DJ in forward direction). Main audio processing unit and main output unit 22 therefore deliver main audio signals to be heard by the audience.

Furthermore, a pre-cue audio processing unit 26 is connected to both the first audio input unit 12 and the second audio input unit 14 to receive the first input data and the second input data and process them as pre-cue audio data to obtain pre-cue output data. Pre-cue audio processing unit 26 may have the same or similar processing capabilities as described above for the main audio processing unit 20, which means that the pre-cue audio data may include audio data of either the first audio data or the second audio data or any other mixture of the first and the second audio data, wherein several audio effects and transport functions may be applied as desired by the user P.

The pre-cue audio data provided by pre-cue audio processing unit 26 may be received in a pre-cue output unit 28 for preparing sound output. Again, pre-cue audio processing unit 26 and pre-cue output unit 28 may be configured to process stereo or multi-channel audio data with different audio signals being provided on a left audio channel 28L and on a right audio channel 28R, respectively. Furthermore, pre-cue output unit 28 may be connected to a communication interface 30 for transmission of the pre-cue audio data to a pair of headphones 32, which, in the present embodiment, is a pair of headphones integrated within an XR headset 34 as described later in more detail. Transmission of the pre-cue audio data from the communication interface 30 to the headphones 32 may be realized through wireless communication 31, for example via Bluetooth or WLAN.

Alternatively, a wired connection by suitable data cables or audio cables may be conceived. As a result, audio signals according to the pre-cue audio data associated to the left and right audio channels 28L, 28R are output by the left and right sides 32L, 32R of the headphones 32 to both ears of user P.

By controlling the pre-cue audio processing unit 26, user P may listen to either the first audio data or the second audio data or a desired mix of the first and the second audio data for personal pre-cuing, wherein the pre-cue audio signal is only audible for the user P through the headphones 32, but not for the audience. In this way, the user P may for example preview a second piece of music, while the audience is hearing the first piece of music.

Pre-cue audio processing unit 26 may also be connected to main audio processing unit 20, such that the pre-cue audio data may include main audio data (i.e. the audio mix prepared for the audience), thus allowing the user P to hear the main audio (alone or mixed with the pre-cue audio data) through the headphones 32 at a desired volume.

Preferably, pre-cue audio processing unit 26 may further comprise a spatial audio unit 36, which is configured to receive and process audio data to obtain spatial audio data (in particular stereo audio data). Spatial audio unit 36 may receive positional information regarding a specific virtual sound source position, which is a position in space of a virtual sound source. The spatial audio data produced by spatial audio unit 36 then have such constitution that, when played back through spatial audio playback equipment to a user, for example through stereo headphones such as the headphones 32 of user P, the spatial audio data create an audible impression to the user that the audio signal that was originally input into spatial audio unit 36 is coming from a virtual sound source positioned at the specific virtual sound source position in space.

In the configuration as described above, the pre-cue audio processing unit 26 may therefore create pre-cue audio data which are spatial audio data, such that the pre-cue audio data is audible as being emitted by virtual sound source which is positioned in space at the virtual sound source position. Furthermore, pre-cue audio processing unit 26 may mix the spatial pre-cue audio data with the main audio data such that the mix contains the main output data in the same spatial format as presented to the audience (i.e. the original stereo image as determined by the first and/or second audio data), wherein the pre-cue audio data have the modified spatial format (a modified stereo image with respect to the original first and/or second audio data) such as to create the acoustic impression of coming from the virtual sound source position. In this manner, user P may clearly audibly distinguish between the pre-cue audio signal and the main audio signal. In fact, this resembles an original audio experience of a DJ who is hearing the main output data through the PA system in the same stereo image as the audience, while hearing the pre-cue audio signal localized as coming from one side of a pair of headphones.

One or more of the above-described items and the items described below may be implemented by a computer 37, which includes a microprocessor, a volatile memory, i.e. a random-access memory (RAM), a non-volatile memory, i.e. a read-only memory (ROM) or a hard drive (HDD) or solid-state drive (SSD), and connectivity means, for example a wireless network interface (e.g. a Bluetooth interface or a WLAN interface), or a USB interface. Computer 37 may be a standard tablet computer, smartphone or desktop computer, and it may be carried on with the user P or disposed at a distance to user P. Computer 37 may be integrated into headset 34. In another embodiment, computer 37 may be implemented as a plurality of separate processing units parts of which being carried on with the user P and other parts being disposed stationary and/or remote with respect to the user, wherein the processing units are connected to one another by wireless connections (e.g. Bluetooth) or wire-based connections (e.g. USB) such as to implement the functions of the system 10 as described herein above and below.

System 10 further includes a gesture detecting apparatus 38 for detecting a position, a posture and a movement of a hand H of the user, and for recognizing hand gestures. Gesture detecting apparatus 38 may in particular include a camera 40 configured and positioned to capture images of a hand H of a user P. Camera 40 may be mounted to headset 34 and may for example be integrated into a display 42 of headset 34. Alternatively, camera 40 may be disposed at some distance to the user P and directed such as to view the user's hand H.

Gesture detecting apparatus 38 may further comprise a gesture processing unit 39 which may be provided by computer 37 and may include an image-processing unit 44, which receives images captured by a camera 40 and a gesture-recognition unit 46, which receives images processed by image-processing unit 44. The gesture-recognition unit 46 is adapted to analyze the images captured by the camera in order to recognize at least one hand gesture. Interpretation of the camera images or camera videos may be based on an appearance-based model using a template database. For example, gesture-recognition unit 46 may compare images or sequences of images captured by camera 40 with reference images or reference image sequences taken from the template database, wherein the reference images or reference image sequences show particular known hand gestures of the same or another user, which have been previously captured by the same or a different camera. Based on a difference between the currently captured images of a hand H of a user P and the reference images or reference image sequences, gesture-recognition unit 46 may classify hand gestures and eventually decide whether a current hand gesture resembles a particular reference gesture.

In other embodiments of the invention, gesture detection apparatus 38 may use other concepts of gesture detection, for example based on data captured by 3D cameras such as stereo cameras or depth-aware cameras. Suitable algorithms for interpretation of 3D camera data are volumetric or skeletal models. Furthermore, electromyography-based models interpreting electrical signals produced by muscles in the body or data obtained from wired gloves may be used. In other words, a touchless user interface (TUI) is preferably used for gesture detection, i.e., an interface obtaining data related to hand gestures without physically touching a hardware controller, such as a handheld controller, a keyboard, a mouse, or a screen.

Alternatively or in addition, gesture detecting apparatus 38, in particular gesture-recognition unit 46, may include an artificial intelligence unit (not shown in FIG. 1), which may comprise a neural network trained to recognize particular hand gestures. The neural network may be trained using training data, which comprise images or image sequences of a hand gesture and associated identification of a particular hand gesture. After training, the trained neural network is then able to classify new hand gestures captured observed by the gesture detecting apparatus 38 and to decide whether or not the new hand gesture corresponds to a particular pre-defined hand gesture.

Preferably, system 10 further includes an artificial reality (XR) apparatus 43 comprising the display 42 mounted on the headset 34 to be viewed by user P. Thus, display 42 may be an XR display and headset 34 may be an XR headset. XR display 42 is configured and mounted to XR headset 34 in such a manner as to cover substantially the entire field of view of both eyes of user P such as to allow full or partial immersion of the user into an artificial surrounding generated by the XR apparatus 43. In particular, the XR apparatus 43 is configured to display virtual objects at certain 3D positions in space in an area around user P, such that the user has an illusion of the objects actually existing at the respective positions. Furthermore, XR apparatus 43 may comprise an XR processing unit 48 for generating XR data to be displayed by XR display 42. In the present embodiment, XR processing unit 48 is implemented by computer 37 and XR data generated by XR processing unit 48 are transmitted via communication interface 30, preferably through a wireless communication 31, to XR headset 34.

FIG. 1 illustrates an artificial environment as generated by the XR apparatus 43, wherein in particular a virtual DJ deck 50 is displayed or projected by XR display 42, such that user P has the visual impression that the virtual DJ deck 50 is positioned in the three-dimensional space in front of user P. Virtual DJ deck 50 may comprise one or more virtual turntables 52, 54, which may play back virtual records. User P may control and interact with virtual DJ deck 50 by hand gestures detected by gesture detecting apparatus 38. For example, gesture detecting apparatus 38 may detect a gesture in which a hand H of user P approaches virtual turntable 52, which may be interpreted as a playback start gesture for the first audio data and therefore may trigger a command for main audio processing unit 20 and/or pre-cue audio processing unit 26 to start playback of main audio data or pre-cue audio data based on the first input data. Therefore, for example, the first virtual turntable 52 may be assigned to control playback of the first audio data and the second virtual turntable 54 may be assigned to controlling playback of the second audio data.

With reference to FIGS. 2 to 5, detection and processing of a pre-cue gesture according to the embodiment of the present invention will now be described in more detail.

User P wearing the XR headset 44, which forms part of both, the gesture detecting apparatus 38 and the XR apparatus 43, is shown in FIGS. 2 to 5 from a front direction, i.e., from the viewpoint of an audience, for example. Camera 40 is preferably mounted to or integrated in XR headset 34 at a central front position, such as to have a field of view V that extends in conical shape in forward direction preferably similar to or substantially corresponding to a natural field of view of the user's eyes.

When a hand H of user P is within the field of view V of camera 40, gesture detecting apparatus 38 is able to detect a three-dimensional position a(x,y,z) of the user's hand H (hand position a(x,y,z) in space). In particular, three coordinates x, y, z or alternatively any other spatial coordinates may be detected by gesture detecting apparatus for the hand position. The hand position a(x,y,z) may be detected with regard to any suitable reference point for which the gesture detecting apparatus 38 is calibrated. For example, a fixed coordinate system may be used and the gesture detecting apparatus 38 may be calibrated to such fixed coordinate system, for example a coordinate system fixed to the ground on which the user P is standing. Calibration may for example be achieved in a method known as such in the prior art for camera-based image recognition, for example by moving camera 40 around in the room that surrounds user P. Alternatively, the hand position a (x,y,z) may be defined relative to a moving coordinate system, for example a coordinate system moving with a body part of user P. Specifically, the position of camera 40 may be used as the reference point defining the moving coordinate system and the hand position a (x,y,z) may be defined as a position in space relative to the camera position.

Regardless of the coordinate system used, gesture detecting apparatus 38 is able to at least detect (by measuring/sensing, calculating, estimating or any combination thereof as explained herein) a distance s between the hand position a (x,y,z) and an ear position b (x,y,z). Furthermore, gesture detecting apparatus 38 has knowledge about an ear position b (x,y,z), which is a position in space of one of the ears of user P. For example, if camera 40 is mounted to XR headset 34 which is to be worn on a head of user P at a predetermined position, the ear position b (x,y,z) may be given or calculated based on the camera position because of a fixed spatial relationship between the camera and the ear.

In the situation shown in FIG. 2, the user's hand H is in a lower position near virtual DJ deck 50. Hand H is within the field of view V of camera 40 and hand position a (x,y,z) is detected by gesture detecting apparatus 38, such that a hand-ear distance s1 can be calculated. The current hand-ear distance s1 is found larger than a predefined first threshold value x1. As a result, gesture detecting apparatus 38 decides that a pre-cue mode is not to be activated and therefore the system 10 remains with the pre-cue mode being deactivated regardless of any movement of hand H in any direction in space. Consequently, user P may move his/her hand H around near virtual DJ deck 50 for performing several DJ operations or the like without activating the pre-cue mode unintentionally.

In the situation shown in FIG. 2, a pre-cue mode is deactivated such that no audible pre-cue audio data are provided by pre-cue output unit 28 or the pre-cue audio data just contain the main audio data, such that user P is hearing through his/her headphones 32 either the main audio data that is also heard by the audience or is hearing no audio signal.

Meanwhile, when the pre-cue mode is deactivated, user P may select a piece of music for preview, in particular either the first piece of music or the second piece of music, and may further set one or more other parameters of the pre-cue audio processing unit 28 such as audio effects or equalizer settings in preparation of a pre-cue operation.

In a situation as shown in FIG. 3, the user P raises his/her hand H up to a position a2 at which the hand-ear distance s1 is equal to or lower than the first threshold value x1. As a side note, one can further see in FIG. 3 a sphere SX1 having its center at the user's ear and a radius x1, and the situation shown in FIG. 3 can also be described as hand H of user P having entered the inner of sphere SX1 and is moving within sphere SX1.

Under the above-described condition of FIG. 3 that s2≤x1, gesture detecting apparatus 38 is further observing hand gestures of user P in order to detect a pre-cue gesture of user P. Now, when the gesture detecting apparatus detects a movement of the hand H (further) towards the ear (for example by detecting that the hand-ear distance s is being (further) reduced), gesture detecting apparatus 38 interprets such gesture as a pre-cue gesture. Consequently, system 10 activates a pre-cue mode, in which pre-cue output unit 28 outputs pre-cue audio data, which are sent through communication interface 30 to the user's headphones 32.

When the pre-cue mode is activated, the pre-cue audio processing unit 26 sets a volume of the pre-cue audio data depending on the hand-ear distance s as detected by gesture detecting apparatus 38. Preferably, system 10 includes the spatial audio unit 36 and the current hand position as detected by gesture detecting apparatus 38 is transmitted to spatial audio unit 36, whereupon spatial audio unit 36 generates spatial audio data by defining a virtual sound source positioned at a virtual sound source position equal to the detected hand position a (x,y,z) and emitting sound according to the pre-cue audio data. User P then hears an audio signal of the pre-cue audio data as coming from his/her hand.

Furthermore, the user P hears the audio signal as moving with his/her hand and increasing in loudness with decreasing hand-ear distance s, and vice-versa, decreasing in loudness with increasing hand-ear distance s.

In a situation as shown in FIG. 4, hand H of user P is further moved towards the ear, thus further reducing the hand-ear distance s below the first threshold value x1. At some point in time, at hand position a3, hand H leaves the field of view V of camera 40, such that it cannot be recognized anymore and hand position a3 cannot be directly measured or sensed through interpretation of the corresponding camera images anymore. However, based on the knowledge that hand H has moved towards the ear, such as to reduce the hand-ear distance s before the hand H has left the field of view V, and optionally further based on a detected movement velocity of the hand H before the hand H has left the field of view V, gesture detecting apparatus 38 may still be able to estimate and/or calculate a hand position a3 with sufficient accuracy such as to decide whether or not a user has positioned his/her hand H close to the ear. The pre-cue mode is therefore preferably maintained activated when the hand H has been detected to have left the field of view V after a movement towards the ear.

In a situation shown in FIG. 5, the user's hand H has actually arrived at the ear and touches the ear or nearly touches the ear, such that the hand-ear distance s equals zero or substantially zero. As in FIG. 4, hand H is again outside the field of view V of camera 40 and therefore a precise hand position a4 cannot be directly sensed. However, the hand position can be estimated or assumed as being in a region close to the ear which will be sufficient for a reliable operation of the pre-cue audio processing unit 28. In a simple embodiment, the situations shown in FIG. 4 and FIG. 5 may be treated equally by system 10 by assuming that the hand position a equals the ear position at any time after the hand H has left the field of view V of camera 40 after having moved in a direction towards the ear. In order to avoid a sudden change in volume of the pre-cue audio signal due to a sudden change in hand position from a measured value to an assumed (zero) value, the dependency between hand position a and volume of pre-cue audio data may be set such that the volume of the pre-cue audio data assumes a maximum when the hand H leaves the field of view V of camera 40 and remains at the maximum value during the time when the hand H is outside the field of view V.

For deactivating the pre-cue mode, the user P may lower his/her hand H and/or move it away from the ear such as to increase the hand-ear distance s. As soon as the hand-ear distance s exceeds a second threshold value, which in the current example may be equal to the first threshold value x1, the pre-cue mode is deactivated. The pre-cue mode may then remain deactivated as long as the hand-ear distance is greater than x1, even if the hand H is moved some distance towards the ear.

The invention claimed is:

1. A system for processing audio data, comprising:
   an audio input unit for receiving audio data representing a piece of music;

15 an audio processing unit for processing the audio data;
an audio output unit for playing the audio data; and
a gesture detecting apparatus for detecting a pre-cue
gesture of a user; wherein the pre-cue gesture com-
prises moving a hand of the user towards an ear of the
user,
wherein the audio processing unit is connected to the
gesture detecting apparatus such as to change process-
ing of the audio data based on the pre-cue gesture
detected by the gesture detecting apparatus, and
wherein the gesture detecting apparatus classifies a
detected hand gesture of the user as being a pre-cue
gesture, only if a hand-ear distance is lower than a
predetermined first threshold value at least at some
point in time during the detected hand gesture.
2. A system for processing audio data, comprising:
an audio input unit for receiving audio data representing
a piece of music;
an audio processing unit for processing the audio data;
an audio output unit for playing the audio data; and
a gesture detecting apparatus for detecting a pre-cue
gesture of a user, wherein
the pre-cue gesture comprises moving a hand of the
user towards an ear of the user,
the audio processing unit is connected to the gesture
detecting apparatus such as to change processing of
the audio data based on the pre-cue gesture detected
by the gesture detecting apparatus,
the system provides a pre-cue mode, and when the
pre-cue mode is activated, the audio processing unit
is configured to set a volume of the audio data as
being dependent on a hand-ear distance, and when
the pre-cue mode is deactivated, the audio process-
ing unit is configured to set a volume of the audio
data as being independent from the hand-ear dis-
tance; and
the system is configured to activate the pre-cue mode
when the hand-ear distance is lower than a prede-
termined second threshold value.
3. A system for processing audio data, comprising:
an audio input unit for receiving audio data representing
a piece of music;
an audio processing unit for processing the audio data;
an audio output unit for playing the audio data; and
a gesture detecting apparatus for detecting a pre-cue
gesture of a user, wherein
the pre-cue gesture comprises moving a hand of the
user towards an ear of the user,
the audio processing unit is connected to the gesture
detecting apparatus such as to change processing of
the audio data based on the pre-cue gesture detected
by the gesture detecting apparatus,
the gesture detecting apparatus classifies a detected
hand gesture in which a hand of the user is moved
towards an ear of the user as not being a pre-cue
gesture, if the gesture detecting apparatus detects a
substantially simultaneous movement of both hands
of the user towards a head of the user.
4. A system for processing audio data, comprising:
an audio input unit for receiving audio data representing
a piece of music;
an audio processing unit for processing the audio data;
an audio output unit for playing the audio data; and
a gesture detecting apparatus for detecting a pre-cue
gesture of a user, wherein
the pre-cue gesture comprises moving a hand of the
user towards an ear of the user,

the audio processing unit is connected to the gesture
detecting apparatus such as to change processing of
the audio data based on the pre-cue gesture detected
by the gesture detecting apparatus,
the audio output unit is a multichannel unit configured
to output the audio data as multichannel audio data
via at least a left channel and a right channel
the audio processing unit includes a spatial audio unit
configured to generate the multichannel audio data as
spatial audio data based on a given spatial source
position of a sound source;
the gesture detecting apparatus is configured to detect
a position in space of the hand of the user; and
the spatial audio unit is configured to generate the
multichannel audio data based on the detected posi-
tion of the hand of the user, such that the audio data
are audible for the user as coming from the detected
position in space of the hand of the user.
5. A system for processing audio data, comprising:
an audio input unit for receiving audio data representing
a piece of music;
an audio processing unit for processing the audio data;
a first audio input unit for receiving first audio data
representing a first piece of music;
a second audio input unit for receiving second audio data
representing a second piece of music different from the
first piece of music;
an audio output unit for playing the audio data; and
a gesture detecting apparatus for detecting a pre-cue
gesture of a user, wherein
the pre-cue gesture comprises moving a hand of the
user towards an ear of the user,
the audio processing unit is connected to the gesture
detecting apparatus such as to change processing of
the audio data based on the pre-cue gesture detected
by the gesture detecting apparatus, and
the audio processing unit is configured to process at
least one of the first audio data and the second audio
data; and
the audio processing unit is connected to the gesture
detecting apparatus and the audio output unit such as
to activate a first pre-cue mode in which the audio
output unit outputs exclusively or predominantly the
first audio data, when the gesture detecting apparatus
detects the pre-cue gesture.
6. The system of claim 5, wherein the gesture detecting
apparatus is configured to detect a first pre-cue gesture
comprising moving a hand of the user towards a left ear of
the user, and to detect a second pre-cue gesture comprising
moving a hand of the user towards a right ear of the user; and
wherein the audio processing unit is configured to activate
the first pre-cue mode, when the gesture detecting
apparatus detects the first pre-cue gesture, and to acti-
vate a second pre-cue mode in which the audio output
unit outputs exclusively or predominantly the second
audio data, when the gesture detecting apparatus
detects the second pre-cue gesture.
7. The system of claim 6, wherein the system is config-
ured such that, in the first pre-cue mode, the first audio data
are output exclusively or predominantly via a first channel,
whereas in the second pre-cue mode, the second audio data
are output exclusively or predominantly via a second chan-
nel.
8. The system of claim 5, wherein the audio processing
unit is a monitor audio processing unit;
wherein the audio output unit is a monitor output unit, and
wherein the system further comprises:

a main audio processing unit for processing the first audio data and the second audio data, wherein the audio processing unit includes a crossfader unit for setting a first volume level associated to the first audio data and a second volume level associated to the second audio data, and a main mixing unit for mixing the first audio data at the first volume level with the second audio data at the second volume level such as to obtain main output data; and a main audio output unit for playing the main output data.

9. The system of claim 8, further comprising:

headphones to be worn by the user or at least one monitor speaker to be directed towards the user, wherein the headphones or the monitor speaker are connected to the monitor output unit; and at least one PA speaker to be directed towards an audience, wherein the PA speaker is connected to the main audio output unit.

10. The system of claim 2, wherein the gesture detecting apparatus comprises a touchless user interface, a camera adapted to capture images of the user's hand, and a gesture recognition unit configured to analyze the images captured by the camera to recognize a movement of the hand towards the ear.

11. The system of claim 10, wherein the camera is arranged such that a field of view of the camera covers an area in front of the user, but does not cover the ear, and wherein the gesture detecting apparatus is configured to detect the pre-cue gesture or to activate the pre-cue mode or to maintain the pre-cue mode active, when detecting the hand of the user leaving the field of view while moving in a direction towards the ear.

\* \* \* \* \*